(12) United States Patent
Oko

(10) Patent No.: US 10,369,874 B2
(45) Date of Patent: Aug. 6, 2019

(54) ARTICULATED BUS

(71) Applicant: Hino Motors, Ltd., Hino-shi (JP)

(72) Inventor: Atsushi Oko, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 15/580,119

(22) PCT Filed: Mar. 8, 2016

(86) PCT No.: PCT/JP2016/057202
§ 371 (c)(1),
(2) Date: Dec. 6, 2017

(87) PCT Pub. No.: WO2016/199465
PCT Pub. Date: Dec. 15, 2016

(65) Prior Publication Data
US 2018/0297460 A1 Oct. 18, 2018

(30) Foreign Application Priority Data
Jun. 8, 2015 (JP) ................. 2015-115895

(51) Int. Cl.
*B60K 1/04* (2019.01)
*B60K 6/40* (2007.10)
(Continued)

(52) U.S. Cl.
CPC .............. *B60K 1/04* (2013.01); *B60K 6/40* (2013.01); *B60K 6/48* (2013.01); *B60K 6/485* (2013.01);
(Continued)

(58) Field of Classification Search
CPC ...................................... B60K 1/04
See application file for complete search history.

(56) References Cited

U.S. PATENT DOCUMENTS

| 4,511,012 A | 4/1985 | Rauneker |
| 6,076,470 A | 6/2000 | Koch |

(Continued)

FOREIGN PATENT DOCUMENTS

| CN | 101421127 A | 4/2009 |
| CN | 102381172 B | 3/2014 |

(Continued)

OTHER PUBLICATIONS

Extended European Search Report dated Nov. 23, 2018 in European Patent Application No. 16807172.8, 7 pages.

(Continued)

*Primary Examiner* — James A Shriver, II
*Assistant Examiner* — James J Triggs
(74) *Attorney, Agent, or Firm* — Oblon, McClelland, Maier & Neustadt, L.L.P.

(57) ABSTRACT

Provided is an articulated bus including a front vehicle including a steering wheel and a rear wheel positioned on a rear side of the steering wheel in a front-rear direction of a vehicle, a rear vehicle disposed on a rear side of the front vehicle in the front-rear direction of the vehicle and mounted with an engine, an articulating portion that swingably connects the front vehicle and the rear vehicle to each other, and a hybrid system including an electric generator that functions as an electric motor and a generator, and an HV battery that stores electric energy generated by the electric generator and supplies electric energy to the electric generator, in which the HV battery is disposed on a roof of the front vehicle.

3 Claims, 4 Drawing Sheets

(51) Int. Cl.
   *B60K 6/48*   (2007.10)
   *B60K 6/485*   (2007.10)
   *B62D 47/02*   (2006.01)
   *B60D 1/00*   (2006.01)
   *B62D 12/02*   (2006.01)

(52) U.S. Cl.
   CPC .............. *B62D 47/025* (2013.01); *B60D 1/00* (2013.01); *B60K 2001/0405* (2013.01); *B60K 2001/0411* (2013.01); *B60L 2200/18* (2013.01); *B60W 2300/10* (2013.01); *B60Y 2200/1432* (2013.01); *B62D 12/02* (2013.01); *Y02T 10/6221* (2013.01)

(56) References Cited

U.S. PATENT DOCUMENTS 6,838,782 B2 *  1/2005  Vu .......................... B60K 6/48
                                                   290/55

2004/0084908 A1   5/2004  Vu
2009/0183935 A1   7/2009  Tsuchiya
2011/0287888 A1 * 11/2011 Muller ..................... B60K 6/48
                                                   477/3

FOREIGN PATENT DOCUMENTS

| | | |
|---|---|---|
| DE | 10 2009 045 448 A1 | 2/2011 |
| EP | 2 857 254 A1 | 4/2015 |
| JP | 2004-66889 A | 3/2004 |
| JP | 2009-18803 A | 1/2009 |
| WO | WO 97/42045 A1 | 11/1997 |

OTHER PUBLICATIONS

Combined Office Action and Search Report dated Jan. 3, 2019 in Chinese Patent Application No. 201680020732.4, 8 pages (with English translation of categories of cited documents).
International Search Report dated May 24, 2016 in PCT/JP2016/057202 filed Mar. 8, 2016.
International Preliminary Report on Patentability and Written Opinion dated Dec. 21, 2017 in PCT/JP2016/057202.

\* cited by examiner

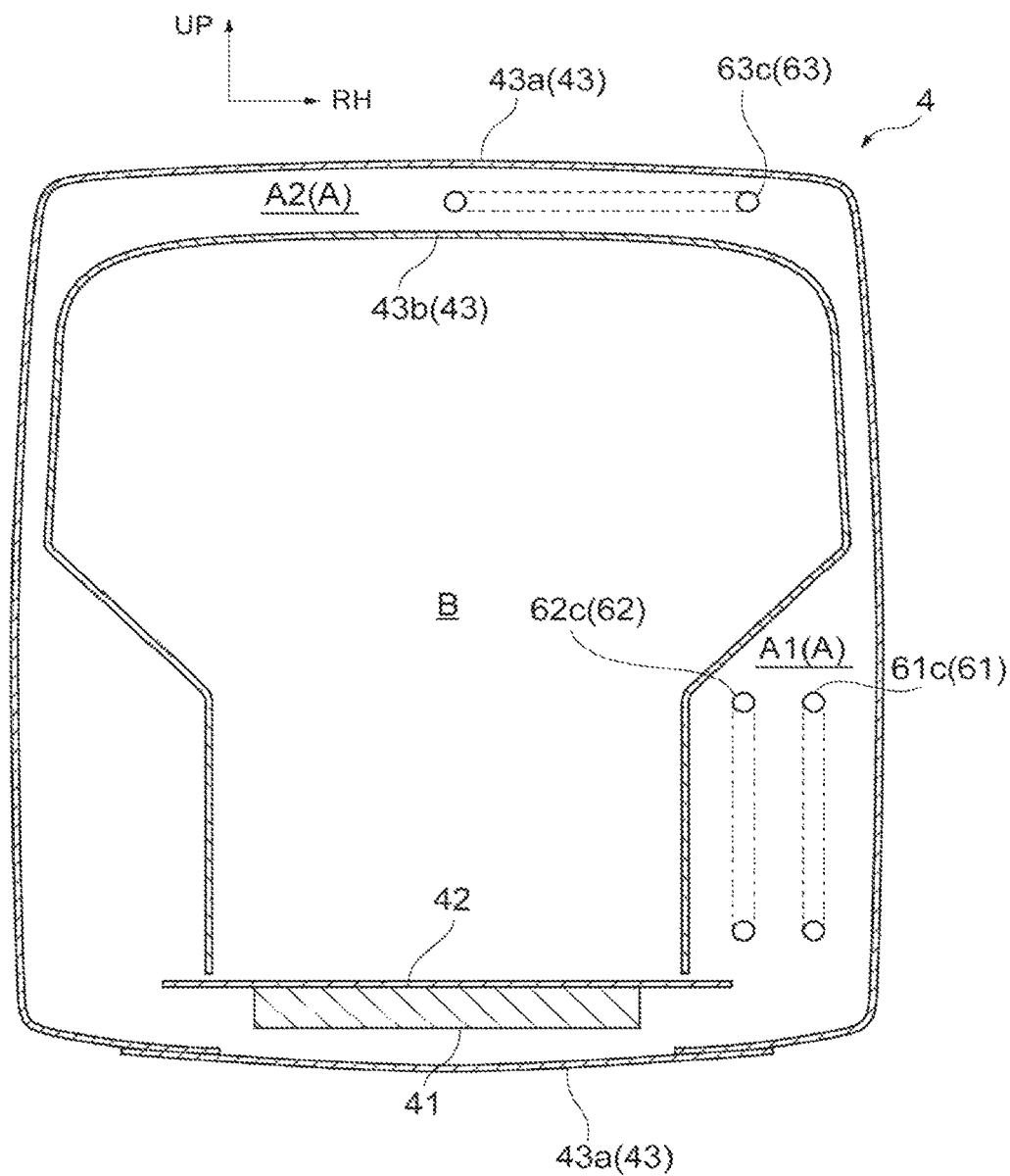

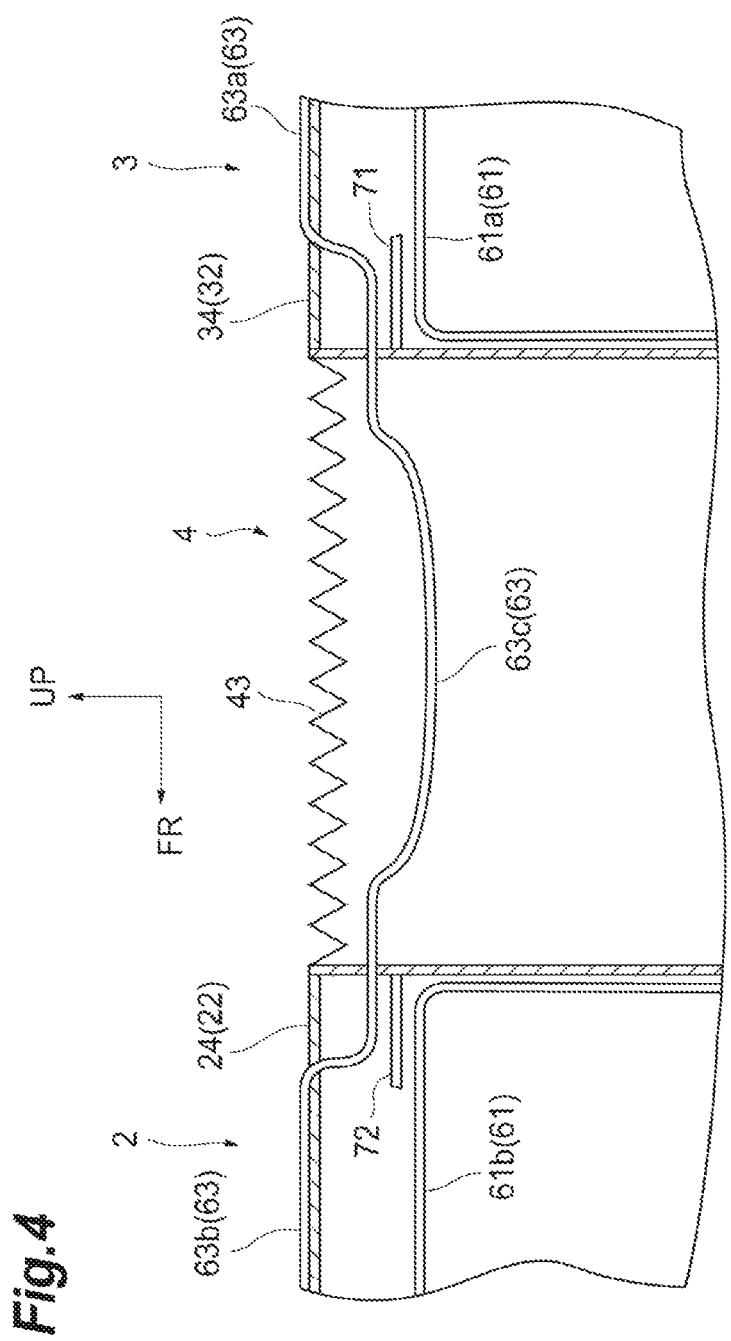

ARTICULATED BUS

TECHNICAL FIELD

The present invention relates to an articulated bus in which a front vehicle and a rear vehicle are swingably connected.

BACKGROUND ART

In Japan, an articulated bus in which a front vehicle and a rear vehicle are connected to each other was introduced at the Tsukuba Expo in 1985. The articulated bus is a bus that allows passengers to pass between the front vehicle and the rear vehicle by providing an opening at a rear of the front vehicle and at a front of the rear vehicle. This articulated bus is a puller-type articulated bus in which the front vehicle pulls the rear vehicle. The puller-type articulated bus is a two-step bus including two steps at a platform by raising a floor since an engine is disposed below a central floor of the front vehicle.

CITATION LIST

Patent Literature

Patent Literature 1: Japanese Unexamined Patent Publication No. 2004-066889

SUMMARY OF INVENTION

Technical Problem

Recently, a non-step low-floor bus from which a step is eliminated by lowering a floor has been adopted to improve a getting on and off property. In the low-floor bus, low-floor and non-step are achieved by disposing an engine at a rear end portion of a vehicle. Given such a trend in this age, low-floor and non-step are strongly required for an articulated bus. In this regard, low-floor and non-step of the articulated bus are considered to be achieved by disposing the engine at a rear end portion of a rear vehicle to obtain a pusher-type articulated bus in which a front vehicle is pushed by the rear vehicle.

In addition, a hybrid system using two types corresponding to an engine and an electric generator (motor generator) as a driving source has been adopted to achieve a reduction in fuel consumption and a reduction in exhaust gas (for example, see Patent Literature 1). In the hybrid system, the electric generator charges an HV battery by converting kinetic energy of the rotating engine into electric energy and rotates by the electric energy charged in the HV battery to drive a vehicle.

When such a hybrid system is mounted on the pusher-type articulated bus, the electric generator is disposed at the rear end portion of the rear vehicle similarly to the engine. In addition, since the electric generator and the HV battery are connected by a high-voltage electric wire, it is preferable to reduce a distance between the electric generator and the HV battery. For this reason, the HV battery is disposed on a roof of the rear vehicle.

However, the electric generator and the HV battery of the hybrid system are heavy objects of the articulated bus. Therefore, when the electric generator is disposed at the rear end portion of the rear vehicle and the HV battery is disposed on the roof of the rear vehicle, the front vehicle becomes too light compared to the rear vehicle, and an axle weight of a steered wheel is insufficient. As a result, steering stability decreases. Furthermore, uneven wear of a tire increases, and deterioration of an air bellows of a suspension of the rear vehicle increases.

Moreover, an air conditioning unit (evaporator) is also disposed on a roof of each vehicle. Then, a centroid position becomes high, and thus the vehicle needs to be greatly changed by enlarging a tread, etc. in order to ensure a maximum stable inclination angle (roll angle). As a result, a vehicle weight and a manufacturing cost increase.

In this regard, an object of one aspect of the invention is to provide an articulated bus capable of suppressing a decrease in steering stability, and a weight increase and a cost increase of a rear vehicle.

Solution to Problem

As a result of extensive research to achieve the above object, the inventor has found that a decrease in steering stability, and a weight increase and a cost increase of a rear vehicle may be suppressed by lengthening a high-voltage electric wire contrary to a technical common sense of those skilled in the art that the high-voltage electric wire is preferably shortened.

In more detail, an articulated bus according to an aspect of the invention includes a front vehicle including a steering wheel and a rear wheel positioned on a rear side of the steering wheel in a front-rear direction of a vehicle, a rear vehicle disposed on a rear side of the front vehicle in the front-rear direction of the vehicle and mounted with an engine, an articulating portion that swingably connects the front vehicle and the rear vehicle to each other, and a hybrid system including an electric generator that functions as an electric motor and a generator, and an HV battery that stores electric energy generated by the electric generator and supplies electric energy to the electric generator, in which the HV battery is disposed on a roof of the front vehicle.

In the articulated bus according to the aspect of the invention, since the HV battery is disposed on the roof of the front vehicle, a weight ratio of the front vehicle to the rear vehicle becomes larger when compared to a case in which the HV battery is disposed on the roof of the rear vehicle. In this way, it is possible to suppress a decrease in steering stability due to an insufficient axle weight of the steering wheel. Furthermore, a centroid position of the rear vehicle is lower when compared to a case in which the HV battery is disposed on the roof of the rear vehicle. In this way, a maximum stable inclination angle (roll angle) of the rear vehicle is reduced, and thus it is possible to suppress a weight increase and a cost increase of the rear vehicle.

In addition, the HV battery may be disposed at the same position as an axle of the steering wheel in the front-rear direction of the vehicle.

In addition, the articulated bus may further include a low-voltage electric wire and a high-voltage electric wire connected to the electric generator and the HV battery, a current of a higher voltage than a voltage of the low-voltage electric wire flowing through the high-voltage electric wire, the articulating portion may include a hood forming a passage space communicating with the front vehicle and the rear vehicle, the low-voltage electric wire may include a first low-voltage electric wire portion disposed inside the rear vehicle, a second low-voltage electric wire portion disposed inside the front vehicle, and a third low-voltage electric wire portion disposed inside the hood to connect the first low-voltage electric wire portion and the second low-voltage electric wire portion to each other, and the high-voltage electric wire may include a first high-voltage electric wire portion disposed on a roof of the rear vehicle to enter an inside of the rear vehicle from the roof of the rear vehicle at a front end portion of the rear vehicle, a second high-voltage electric wire portion disposed on the roof of the front vehicle to enter an inside of the front vehicle from the roof of the front vehicle at a rear end portion of the front vehicle, and a third high-voltage electric wire portion disposed inside the hood to connect the first high-voltage electric wire portion and the second high-voltage electric wire portion to each other.

In addition, the articulated bus may further include a first shielding portion made of metal disposed between the first low-voltage electric wire portion and the first high-voltage electric wire portion at the front end portion of the rear vehicle to shield the first low-voltage electric wire portion and the first high-voltage electric wire portion, and a second shielding portion made of metal disposed between the second low-voltage electric wire portion and the second high-voltage electric wire portion at the rear end portion of the front vehicle to shield the second low-voltage electric wire portion and the second high-voltage electric wire portion.

Advantageous Effects of Invention

According to an aspect of the invention, it is possible to suppress a decrease in steering stability, and a weight increase and a cost increase of a rear vehicle.

BRIEF DESCRIPTION OF DRAWINGS

FIG. 3 is a cross-sectional view of the articulating portion taken along line illustrated in FIG. 1.
FIG. 4 is a schematic cross-sectional view around the articulating portion.

DESCRIPTION OF EMBODIMENTS

Figure 1:
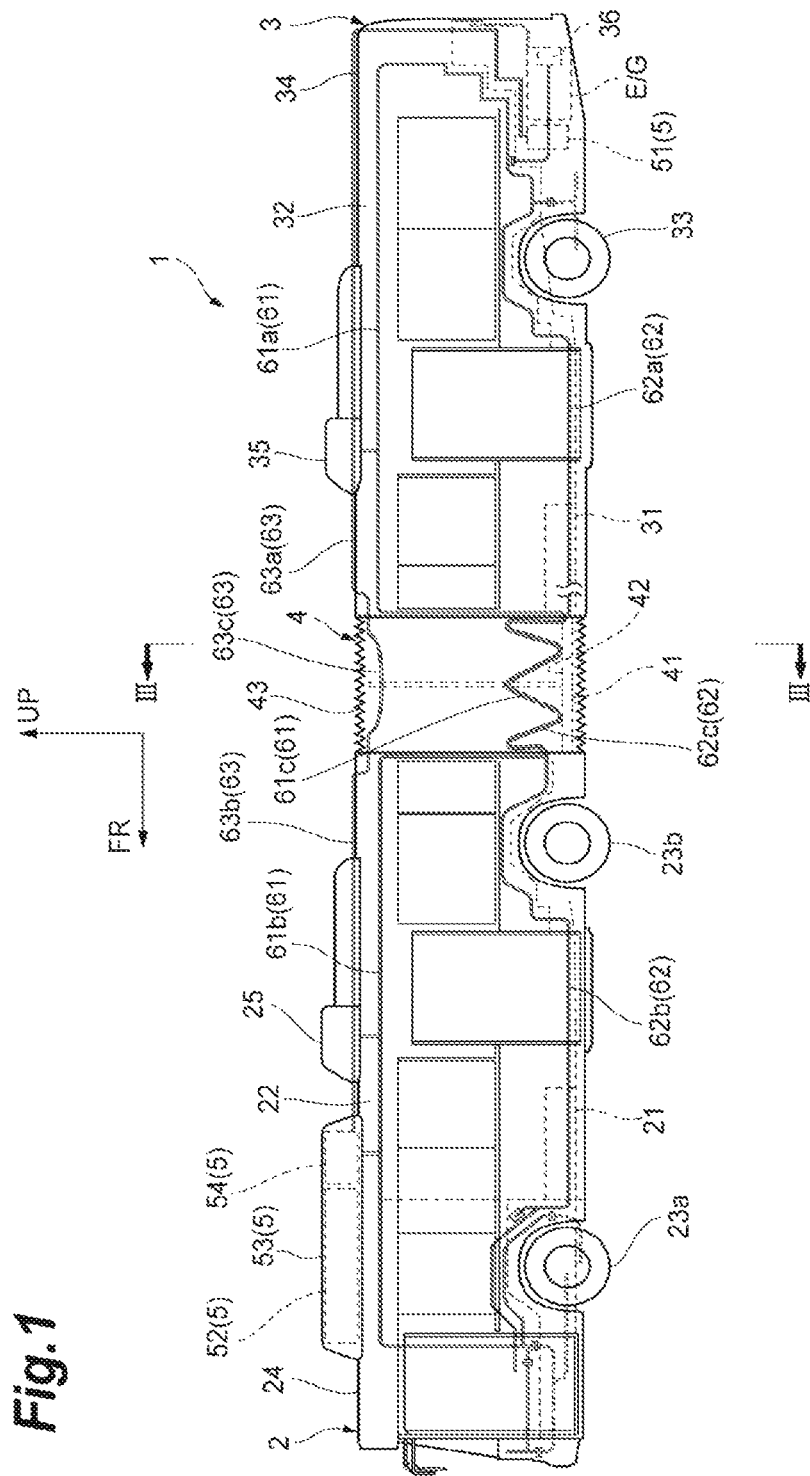
FIG. 1 is a schematic side view of an articulated bus.

Hereinafter, an articulated bus according to an embodiment will be described in detail with reference to drawings. In description below, the same or similar elements will be denoted by the same reference numerals and a repeated description thereof will be omitted. In addition, in description below, a front and a rear in a front-rear direction of a vehicle will be simply referred to as a front and a rear, and "up" and "down" in a vertical direction of the vehicle will be simply referred to as "up" and "down".

FIG. 1 is a schematic side view of the articulated bus. As illustrated in FIG. 1, the articulated bus 1 of the present embodiment includes a front vehicle 2, a rear vehicle 3, an articulating portion 4, and a hybrid system 5.

The front vehicle 2 is disposed on a front side of the articulated bus 1 in the front-rear direction of the vehicle. The front vehicle 2 is a driven vehicle on which no engine for driving the articulated bus 1 is mounted. The front vehicle 2 is lowered similarly to a non-step bus. For this reason, the front vehicle 2 is not provided with a step for getting on and off.

A front wheel 23a located on a front side in the front-rear direction of the vehicle and a first rear wheel 23b positioned on a rear side of the front wheel 23a in the front-rear direction of the vehicle are attached to the front vehicle 2. The front wheel 23a is a steering wheel connected to a steering mechanism. The front wheel 23a and the first rear wheel 23b are driven wheels that are not rotationally driven. The front vehicle 2 includes a front chassis frame 21 and a front vehicle body 22.

The front chassis frame 21 includes a plurality of frame members. The front chassis frame 21 includes at least a transverse portion 21a (see FIG. 2) extending in a width direction of the vehicle at a rear end portion in the front-rear direction of the vehicle. The transverse portion 21a is a member connected to the articulating portion 4, and is also referred to as a bulkhead.

The front vehicle body 22 is connected to the front chassis frame 21 to form a vehicle interior. A front vehicle air conditioning unit 25 and an HV (Hybrid Vehicle) battery 52 (described below) are disposed on a roof 24 of the front vehicle body 22. The front vehicle air conditioning unit 25 includes an evaporator (not illustrated) that performs air conditioning in a passenger compartment of the front vehicle 2. The front vehicle air conditioning unit 25 (in particular, the evaporator) is disposed between the front wheel 23a and the first rear wheel 23b in the front-rear direction of the vehicle. A passage opening (not illustrated) is formed at a rear end portion of the front vehicle body 22 to allow passengers to pass between the front vehicle 2 and the rear vehicle 3.

The rear vehicle 3 is disposed on a rear side of the articulated bus 1 in the front-rear direction of the vehicle, and behind the front vehicle 2 in the front-rear direction of the vehicle. The rear vehicle 3 is a driving vehicle in which an engine E/G for driving the articulated bus 1 is mounted at the rear end portion in the front-rear direction of the vehicle. An alternator 36 that generates electric power by rotational driving of the engine E/G is mounted at a rear end portion of the rear vehicle 3 in the front-rear direction of the vehicle. The rear vehicle 3 is lowered similarly to a non-step bus. For this reason, the rear vehicle 3 is not provided with a step for getting on and off.

A second rear wheel 33 positioned at a central portion in the front-rear direction of the vehicle is attached to the rear vehicle 3. The second rear wheel 33 is a driving wheel that is rotationally driven by rotation of the engine E/G to drive the articulated bus 1. The second rear wheel 33 is disposed in front of the engine E/G in the front-rear direction of the vehicle. The rear vehicle 3 includes a rear chassis frame 31 and a rear vehicle body 32.

The rear chassis frame 31 includes a plurality of frame members. The rear chassis frame 31 includes at least a first transverse portion 31a (see FIG. 2) extending in the width direction of the vehicle at a rear end portion in the front-rear direction of the vehicle. The first transverse portion 31a is a member connected to the articulating portion 4, and is also referred to as a bulkhead.

The rear vehicle body 32 is connected to the rear chassis frame 31 to form the vehicle interior. A rear vehicle air conditioning unit 35 is disposed on a roof 34 of the rear vehicle body 32. The rear vehicle air conditioning unit 35 includes an evaporator (not illustrated) that performs air conditioning in a passenger compartment of the rear vehicle 3. The rear vehicle air conditioning unit 35 (in particular, the evaporator) is disposed between the front end of the rear vehicle 3 in the front-rear direction of the vehicle and the second rear wheel 33. A passage opening (not illustrated) is formed in a front end portion of the rear vehicle body 32 to allow passengers to pass between the front vehicle 2 and the rear vehicle 3.

Figure 2:
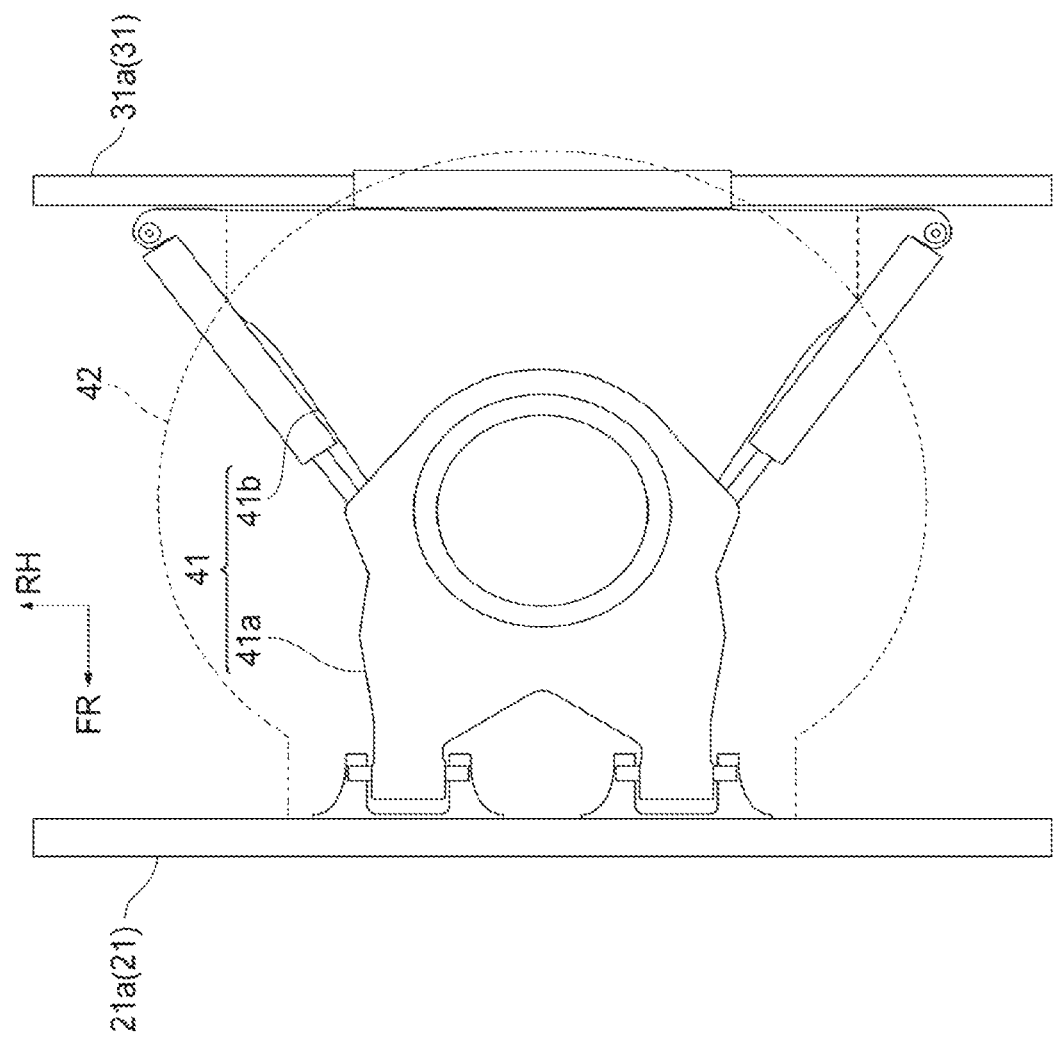
FIG. 2 is a schematic plan view of an articulating portion.

FIG. 2 is a schematic plan view of the articulating portion. FIG. 3 is a cross-sectional view of the articulating portion taken along line illustrated in FIG. 1. As illustrated in FIG.

1 to FIG. 3, the articulating portion 4 swingably connects the front chassis frame 21 and the rear chassis frame 31 to each other between the front vehicle 2 and the rear vehicle 3. The articulating portion 4 includes an articulation mechanism portion 41, a passage portion 42, and a hood 43.

The articulation mechanism portion 41 includes a front connecting portion 41a connected to the transverse portion 21a of the front chassis frame 21 and a rear connecting portion 41b connected to the first transverse portion 31a of the rear chassis frame 31. The front connecting portion 41a and the rear connecting portion 41b are swingably connected using an axial line extending in the vertical direction of the vehicle as a swinging center between the front vehicle 2 and the rear vehicle 3. Instead of easily detachably connecting the front chassis frame 21 and the rear chassis frame 31 like a trailer (towing vehicle), the articulation mechanism portion 41 undetachably connects the front chassis frame 21 and the rear chassis frame 31 by fastening bolts. However, when there is an extraordinary circumstance such as maintenance, it is possible to separate the front chassis frame 21 and the rear chassis frame 31 by removing the bolts.

The passage portion 42 is bridged between the front vehicle 2 and the rear vehicle 3 and placed on the articulation mechanism portion 41.

The hood 43 is attached to the front vehicle 2 and the rear vehicle 3 to cover the articulation mechanism portion 41 and the passage portion 42. The hood 43 has a double structure of an outshell 43a and a lining 43b, and a space A is formed between the outshell 43a and the lining 43b. The outshell 43a forms an external shape of the hood 43. The lining 43b forms a passage space B communicating with the passage opening of the front vehicle 2 and the passage opening of the rear vehicle 3 along with the passage portion 42.

The hybrid system 5 includes an electric generator 51 and the HV battery 52.

The electric generator 51 is a motor generator that functions as an electric motor and a generator. That is, the electric generator 51 functions as a generator, the electric generator 51 converts kinetic energy of the rotating engine E/G into electric energy to charge the HV battery 52. On the other hand, when the electric generator 51 functions as an electric motor, the electric generator 51 is rotated by the electric energy charged in the HV battery 52 to rotationally drive the second rear wheel 33. For this reason, the electric generator 51 is disposed at the rear end portion of the rear vehicle 3 around the engine E/G and the second rear wheel 33.

The HV battery 52 is a battery dedicated to the hybrid system 5. The HV battery 52 stores electric energy generated by the electric generator 51 and supplies electric energy to the electric generator 51. The HV battery 52 is a module including a plurality of cells, and a weight thereof is, for example, about 500 kg. The HV battery 52 is disposed on the roof 24 of the front vehicle 2. Specifically, the HV battery 52 is disposed at the same position as an axle of the front wheel 23a in the front-rear direction of the vehicle.

The HV battery 52 is installed in a hybrid unit 53. In addition to the HV battery 52, a PCU inverter 54 for inverting a direct current of a high voltage to an alternating current, a battery computer (not illustrated) for managing a state of charge (SOC) at an appropriate value, a cooling fan (not illustrated) for sending cooling air to the HV battery 52, a system main relay (not illustrated) for cutting off and shutting off power of a high voltage circuit, etc. are installed in the hybrid unit 53. A weight of the entire hybrid unit 53 is, for example, about 700 kg.

FIG. 4 is a schematic cross-sectional view around the articulating portion. As illustrated in FIG. 1 and FIG. 4, the articulated bus 1 includes an upper low-voltage electric wire 61, a lower low-voltage electric wire 62, and a high-voltage electric wire 63.

The lower low-voltage electric wire 62 is an electric wire of a power supply system connected to the alternator 36. The lower low-voltage electric wire 62 is wired around floors inside the front vehicle 2 and the rear vehicle 3, and is connected to respective devices of the articulated bus 1 except for the HV battery 52. The devices connected to the lower low-voltage electric wire 62 correspond to a low-voltage battery (24 V), a heater unit, a push button, etc. The lower low-voltage electric wire 62 includes a first lower low-voltage electric wire portion 62a, a second lower low-voltage electric wire portion 62b, and a third lower low-voltage electric wire portion 62c.

The first lower low-voltage electric wire portion 62a is connected to the alternator 36, and wired around the floor inside the rear vehicle 3. The first lower low-voltage electric wire portion 62a extends from the alternator 36 up to around the floor by turning around a front of the engine E/G at the rear end portion of the rear vehicle 3. The second lower low-voltage electric wire portion 62b is wired around the floor inside the front vehicle 2. The third lower low-voltage electric wire portion 62c is wired inside the hood 43, and connected to the first lower low-voltage electric wire portion 62a and the second lower low-voltage electric wire portion 62b. Similarly to the third upper low-voltage electric wire portion 61c, the third lower low-voltage electric wire portion 62c is incorporated in a space A1 (see FIG. 3).

The upper low-voltage electric wire 61 is an electric wire of a control system (signal system) connected to a junction block (not illustrated). The junction block is disposed above the engine E/G, and is supplied with power from the low-voltage battery (24 V) through the lower low-voltage electric wire 62. The upper low-voltage electric wire 61 is wired around ceilings inside the front vehicle 2 and the rear vehicle 3, and connected to respective devices of the articulated bus 1 except for the HV battery 52. The devices connected to the upper low-voltage electric wire 61 correspond to chassis electric components such as a computer, a fuse, etc. Specifically, the devices correspond to an HV•ECU, an engine ECU, an ABS, a vehicle height adjustment device, a transmission, etc. The upper low-voltage electric wire 61 includes a first upper low-voltage electric wire portion 61a (first low-voltage electric wire portion), a second upper low-voltage electric wire portion 61b (second low-voltage electric wire portion), and a third upper low-voltage electric wire portion 61c (third low-voltage electric wire portion).

The first upper low-voltage electric wire portion 61a is connected to the junction block and wired around the ceiling inside the rear vehicle 3. The second upper low-voltage electric wire portion 61b is wired around the ceiling inside the front vehicle 2. The third upper low-voltage electric wire portion 61c is wired inside the hood 43 to connect the first upper low-voltage electric wire portion 61a and the second upper low-voltage electric wire portion 61b. The first upper low-voltage electric wire portion 61a and the second upper low-voltage electric wire portion 61b are accommodated in attic spaces (not illustrated) of the rear vehicle 3 and the front vehicle 2, respectively. The attic spaces are spaces located above the passenger compartment and isolated from the passenger compartment. The third upper low-voltage electric wire portion 61c is accommodated in the space A1 (see FIG. 3) on a side of the passage space B in the space A between the outshell 43a and the lining 43b of the hood 43.

The high-voltage electric wire 63 is an electric wire connected to the electric generator 51, and a current of a higher voltage than that of the upper low-voltage electric wire 61 and the lower low-voltage electric wire 62 flows therethrough. For example, a current of 600 V flows through the high-voltage electric wire 63, and a current of 24 V flows through the upper low-voltage electric wire 61 and the lower low-voltage electric wire 62. The high-voltage electric wire 63 is wired on the roof 24 of the front vehicle 2 and on the roof 34 of the rear vehicle 3 and connected to the HV battery 52 through the PCU inverter 54. The high-voltage electric wire 63 includes a first high-voltage electric wire portion 63a, a second high-voltage electric wire portion 63b, and a third high-voltage electric wire portion 63c.

The first high-voltage electric wire portion 63a is connected to the electric generator 51 and wired on the roof 34 of the rear vehicle 3. The first high-voltage electric wire portion 63a extends from the electric generator 51 to the roof 34 of the rear vehicle 3 at the rear end portion of the rear vehicle 3. A cover (not illustrated) covering the first high-voltage electric wire portion 63a is mounted on the roof 34 of the rear vehicle 3. In addition, the first high-voltage electric wire portion 63a enters the inside of the rear vehicle 3 from above the roof 34 of the rear vehicle 3 at the front end portion of the rear vehicle 3. That is, at the front end portion of the rear vehicle 3, both the first upper low-voltage electric wire portion 61a and the first high-voltage electric wire portion 63a are accommodated in the attic space of the rear vehicle 3. For this reason, there is a possibility that the first upper low-voltage electric wire portion 61a and the first high-voltage electric wire portion 63a may be mutually affected by noise thereof by being disposed at positions close to each other at the front end portion of the rear vehicle 3. In this regard, a first shielding portion 71 is disposed between the first upper low-voltage electric wire portion 61a and the first high-voltage electric wire portion 63a at the front end portion of the rear vehicle 3. The first shielding portion 71 is a metal member that shields the first upper low-voltage electric wire portion 61a and the first high-voltage electric wire portion 63a. For example, a thin metal plate may be used as the first shielding portion 71.

At the rear end portion of the rear vehicle 3, both the first upper low-voltage electric wire portion 61a and the first high-voltage electric wire portion 63a are disposed inside the rear vehicle body 32. However, at this position, the first upper low-voltage electric wire portion 61a may be sufficiently separated from the first high-voltage electric wire portion 63a so as not to be affected by noise, and thus the shielding portion may not be disposed between the first upper low-voltage electric wire portion 61a and the first high-voltage electric wire portion 63a.

The second high-voltage electric wire portion 63b is wired on the roof 24 of the front vehicle 2 and connected to the HV battery 52 through the PCU inverter 54. A cover (not illustrated) covering the second high-voltage electric wire portion 63b is mounted on the roof 24 of the front vehicle 2. Further, the second high-voltage electric wire portion 63b enters the inside of the front vehicle 2 from above the roof 24 of the front vehicle 2 at the rear end portion of the front vehicle 2. That is, at the rear end portion of the front vehicle 2, both the second upper low-voltage electric wire portion 61b and the second high-voltage electric wire portion 63b are accommodated in the attic space of the front vehicle 2. For this reason, there is a possibility that the second upper low-voltage electric wire portion 61b and the second high-voltage electric wire portion 63b may be mutually affected by noise thereof by being disposed at positions close to each other at the rear end portion of the front vehicle 2.

In this regard, a second shielding portion 72 is disposed between the second upper low-voltage electric wire portion 61b and the second high-voltage electric wire portion 63b at the rear end portion of the front vehicle 2. The second shielding portion 72 is a metal member that shields the second upper low-voltage electric wire portion 61b and the second high-voltage electric wire portion 63b. For example, a thin metal plate may be used as the second shielding portion 72.

The third high-voltage electric wire portion 63c is wired inside the hood 43 to connect the first high-voltage electric wire portion 63a and the second high-voltage electric wire portion 63b to each other. Specifically, the third high-voltage electric wire portion 63c connects the first high-voltage electric wire portion 63a of the front end portion of the rear vehicle 3 entering the inside of the rear vehicle 3 to the second high-voltage electric wire portion 63b of the rear end portion of the front vehicle 2 entering the inside of the front vehicle 2. The third high-voltage electric wire portion 63c is accommodated in a space A2 (see FIG. 3) of an attic in the space A between the outshell 43a and the lining 43b of the hood 43.

In the space A1, the third upper low-voltage electric wire portion 61c and the third lower low-voltage electric wire portion 62c may be sufficiently separated from the third high-voltage electric wire portion 63c so as not to be affected by noise, and thus the shielding portion may not be disposed between the third upper low-voltage electric wire portion 61c and the third lower low-voltage electric wire portion 62c, and the third high-voltage electric wire portion 63c.

As described above, in the articulated bus 1 according to the present embodiment, since the HV battery 52 is disposed on the roof 24 of the front vehicle 2, a weight ratio of the front vehicle 2 to the rear vehicle 3 becomes larger when compared to a case in which the HV battery 52 is disposed on the roof 34 of the rear vehicle 3. In this way, it is possible to suppress a decrease in steering stability due to an insufficient axle weight of the front wheel 23a serving as a steering wheel. Furthermore, a centroid position of the rear vehicle 3 is lower when compared to a case in which the HV battery 52 is disposed on the roof 34 of the rear vehicle 3. In this way, a maximum stable inclination angle (roll angle) of the rear vehicle 3 is reduced, and thus it is possible to suppress a weight increase and a cost increase of the rear vehicle 3.

Further, in this articulated bus 1, since the HV battery 52 and the axle of the front wheel 23a serving as the steering wheel are disposed at the same position in the front-rear direction of the vehicle, the axle weight of the front wheel 23a serving as the steering wheel increases, and steering stability is improved.

Incidentally, it is preferable that the high-voltage electric wire not be exposed to ultraviolet rays, rain, snow, etc. to prolong a life of the high-voltage electric wire. In addition, it is preferable to shield the high-voltage electric wire and the low-voltage electric wire to inhibit the upper low-voltage electric wire 61 and the high-voltage electric wire 63 from being mutually affected by noise.

In this regard, in the articulated bus 1, it is possible to inhibit the upper low-voltage electric wire 61 and the high-voltage electric wire 63 from being mutually affected by noise using the metal plates included in the roof 24 and the roof 34 while prolonging a life of the high-voltage electric wire 63 by disposing the high-voltage electric wire 63 on the roof 24 of the front vehicle 2 and the roof 34 of the rear vehicle 3 to which a cover is easily attached. Meanwhile, the hood 43 bends while extending and contracting along with swing of the rear vehicle 3 with respect to the front vehicle 2, and thus it is difficult to attach the cover to the outside of the hood 43. Therefore, the life of the high-voltage electric wire 63 may be prolonged by disposing the high-voltage electric wire 63 inside the hood 43 between the rear vehicle 3 and the front vehicle 2.

At the front end portion of the rear vehicle 3 and the rear end portion of the front vehicle 2, the upper low-voltage electric wire 61 and the high-voltage electric wire 63 are disposed inside the rear vehicle 3 and the front vehicle 2, and thus there is a possibility that the upper low-voltage electric wire 61 and the high-voltage electric wire 63 may be mutually affected by noise. Therefore, in the articulated bus 1, it is possible to inhibit the upper low-voltage electric wire 61 and the high-voltage electric wire 63 from being mutually affected by noise by disposing the first shielding portion 71 and the second shielding portion 72 made of metal between the upper low-voltage electric wire 61 and the high-voltage electric wire 63 at the front end portion of the rear vehicle 3 and the rear end portion of the front vehicle 2.

Although the preferred embodiment of the invention has been described above, the invention is not limited to the above-described embodiment, and may be modified or applied to another embodiment within a scope not changing a subject matter described in respective claims. For example, the HV battery may be disposed at a different position from the axle of the front wheel in the front-rear direction of the vehicle. Further, similarly to the first high-voltage electric wire and the second high-voltage electric wire, the third high-voltage electric wire may be disposed outside the hood (for example, on the hood). In addition, the PCU inverter 54 may be separated from the hybrid unit 53 and transferred to another place. For example, the PCU inverter 54 may be transferred to a place around the electric generator 51.

REFERENCE SIGNS LIST

1 . . . articulated bus, 2 . . . front vehicle, 3 . . . rear vehicle, 4 . . . articulating portion, 5 . . . hybrid system, 21 . . . front chassis frame, 21a . . . transverse portion, 22 . . . front vehicle body, 23a . . . front wheel, 23b . . . first rear wheel, 24 . . . roof, 25 . . . front vehicle air conditioning unit, 31 . . . rear chassis frame, 31a . . . first transverse portion, 32 . . . rear vehicle body, 33 . . . second rear wheel, 34 . . . roof, 35 . . . rear vehicle air conditioning unit, 36 . . . alternator, 41 . . . articulation mechanism portion, 41a . . . front connecting portion, 41b . . . rear connecting portion, 42 . . . passage portion, 43 . . . hood, 43a . . . outshell, 43b . . . lining, 51 . . . electric generator, 52 . . . HV battery, 53 . . . hybrid unit, 54 . . . PCU inverter, 61 . . . upper low-voltage electric wire (low-voltage electric wire), 61a . . . first upper low-voltage electric wire portion (first low-voltage electric wire portion), 61b . . . second upper low-voltage electric wire portion (second low-voltage electric wire portion), 61c . . . third upper low-voltage electric wire portion (third low-voltage electric wire portion), 62 . . . lower low-voltage electric wire, 62a . . . first lower low-voltage electric wire portion, 62b . . . second lower low-voltage electric wire portion, 62c . . . third lower low-voltage electric wire portion, 63 . . . high-voltage electric wire, 63a . . . first high-voltage electric wire portion, 63b . . . second high-voltage electric wire portion, 63c . . . third high-voltage electric wire portion, 71 . . . first shielding portion, 72 . . . second shielding portion, A (A1, A2) . . . space, B . . . passage space, E/G . . . engine.

The invention claimed is:

1. An articulated bus comprising:
a front vehicle including a steering wheel and a rear wheel positioned on a rear side of the steering wheel in a front-rear direction of a vehicle;
a rear vehicle disposed on a rear side of the front vehicle in the front-rear direction of the vehicle and mounted with an engine;
an articulating portion that swingably connects the front vehicle and the rear vehicle to each other;
a hybrid system including an electric generator that functions as an electric motor and a generator, and an HV battery that stores electric energy generated by the electric generator and supplies electric energy to the electric generator;
a low-voltage electric wire; and
a high-voltage electric wire connected to the electric generator and the HV battery, a current of a higher voltage than a voltage of the low-voltage electric wire flowing through the high-voltage electric wire, wherein
the HV battery is disposed on a roof of the front vehicle,
the articulating portion includes a hood forming a passage space communicating with the front vehicle and the rear vehicle,
the low-voltage electric wire includes
a first low-voltage electric wire portion disposed inside the rear vehicle,
a second low-voltage electric wire portion disposed inside the front vehicle, and
a third low-voltage electric wire portion disposed inside the hood to connect the first low-voltage electric wire portion and the second low-voltage electric wire portion to each other, and
the high-voltage electric wire includes
a first high-voltage electric wire portion disposed on a roof of the rear vehicle to enter an inside of the rear vehicle from the roof of the rear vehicle at a front end portion of the rear vehicle,
a second high-voltage electric wire portion disposed on the roof of the front vehicle to enter an inside of the front vehicle from the roof of the front vehicle at a rear end portion of the front vehicle, and
a third high-voltage electric wire portion disposed inside the hood to connect the first high-voltage electric wire portion and the second high-voltage electric wire portion to each other.

2. The articulated bus according to claim 1, wherein the HV battery is disposed at the same position as an axle of the steering wheel in the front-rear direction of the vehicle.

3. The articulated bus according to claim 1, further comprising:
a first shielding portion made of metal disposed between the first low-voltage electric wire portion and the first high-voltage electric wire portion at the front end portion of the rear vehicle to shield the first low-voltage electric wire portion and the first high-voltage electric wire portion; and
a second shielding portion made of metal disposed between the second low-voltage electric wire portion and the second high-voltage electric wire portion at the rear end portion of the front vehicle to shield the second low-voltage electric wire portion and the second high-voltage electric wire portion.

* * * * *